(12) United States Patent
Molisch et al.

(10) Patent No.: US 11,546,068 B2
(45) Date of Patent: Jan. 3, 2023

(54) RAY TRACING TECHNIQUE FOR WIRELESS CHANNEL MEASUREMENTS

(71) Applicant: Cohere Technologies, Inc., Santa Clara, CA (US)

(72) Inventors: Andreas Molisch, Santa Clara, CA (US); Robert Fanfelle, Santa Clara, CA (US)

(73) Assignee: Cohere Technologies, Inc., Santa Clara, CA (US)

( * ) Notice: Subject to any disclaimer, the term of this patent is extended or adjusted under 35 U.S.C. 154(b) by 128 days.

(21) Appl. No.: 16/638,254

(22) PCT Filed: Aug. 7, 2018

(86) PCT No.: PCT/US2018/045649
§ 371 (c)(1),
(2) Date: Feb. 11, 2020

(87) PCT Pub. No.: WO2019/032605
PCT Pub. Date: Feb. 14, 2019

(65) Prior Publication Data
US 2021/0077625 A1 Mar. 18, 2021

Related U.S. Application Data

(60) Provisional application No. 62/544,660, filed on Aug. 11, 2017.

(51) Int. Cl.
*H04B 17/391* (2015.01)
*H04B 3/46* (2015.01)
(Continued)

(52) U.S. Cl.
CPC .......... *H04B 17/3912* (2015.01); *H04B 3/46* (2013.01); *H04B 10/07* (2013.01); *H04B 17/00* (2013.01);
(Continued)

(58) Field of Classification Search
CPC .......... H04B 3/46; H04B 10/07; H04B 17/00; H04B 17/0081; H04B 17/30; H04B 17/391; H04B 17/3912
See application file for complete search history.

(56) References Cited

U.S. PATENT DOCUMENTS 4,754,493 A 6/1988 Coates
5,083,135 A 1/1992 Nagy et al.
(Continued)

FOREIGN PATENT DOCUMENTS

CN 1235720 A 11/1999
CN 101682316 A 3/2010
(Continued)

OTHER PUBLICATIONS

Office Action for U.S. Appl. No. 13/117,119, dated Aug. 5, 2013, 5 pages.
(Continued)

*Primary Examiner* — Blane J Jackson
(74) *Attorney, Agent, or Firm* — Perkins Coie LLP

(57) ABSTRACT

The computer-implemented method includes simulating, by a processor, using an electromagnetic solver including ray launching or ray tracing, multiple rays that reach a vicinity of a receiver of a wireless channel, determining locations of interactions of the rays with an environment of the wireless channel, post-processing, using one or more of the multiple rays, information about received signal at the receiver to obtain temporal variations therein, and determining a characteristic of the wireless channel using results of the post-processing.

20 Claims, 3 Drawing Sheets

(51) Int. Cl.
*H04B 10/07* (2013.01)
*H04B 17/00* (2015.01)
*H04B 17/30* (2015.01)

(52) U.S. Cl.
CPC ......... *H04B 17/0087* (2013.01); *H04B 17/30* (2015.01); *H04B 17/391* (2015.01)

(56) References Cited

U.S. PATENT DOCUMENTS

| | | |
|---|---|---|
| 5,182,642 A | 1/1993 | Gersdorff et al. |
| 5,623,511 A | 4/1997 | Bar-David et al. |
| 5,831,977 A | 11/1998 | Dent |
| 5,872,542 A | 2/1999 | Simons et al. |
| 5,956,624 A | 9/1999 | Hunsinger et al. |
| 6,212,246 B1 | 4/2001 | Hendrickson |
| 6,289,063 B1 | 9/2001 | Duxbury |
| 6,356,555 B1 | 3/2002 | Rakib et al. |
| 6,388,621 B1 | 5/2002 | Lynch |
| 6,426,983 B1 | 7/2002 | Rakib et al. |
| 6,608,864 B1 | 8/2003 | Strait |
| 6,631,168 B2 | 10/2003 | Izumi |
| 6,704,366 B1 | 3/2004 | Combes et al. |
| 6,956,814 B1 | 10/2005 | Campanella |
| 7,010,048 B1 | 3/2006 | Shattil |
| 7,327,812 B2 | 2/2008 | Auer |
| 7,392,018 B1 | 6/2008 | Ebert et al. |
| 7,689,049 B2 | 3/2010 | Monro |
| 7,715,844 B2 * | 5/2010 | Bi ................. H04B 17/391 455/446 |
| 7,773,685 B2 | 8/2010 | Tirkkonen et al. |
| 7,864,877 B2 | 1/2011 | Hottinen |
| 8,229,017 B1 | 7/2012 | Lee et al. |
| 8,259,845 B2 | 9/2012 | Dent |
| 8,401,131 B2 | 3/2013 | Fety et al. |
| 8,547,988 B2 | 10/2013 | Hadani et al. |
| 8,619,892 B2 | 12/2013 | Vetter et al. |
| 8,717,210 B2 | 5/2014 | Eldar et al. |
| 8,879,378 B2 | 11/2014 | Rakib et al. |
| 8,892,048 B1 | 11/2014 | Turner |
| 8,976,851 B2 | 3/2015 | Hadani et al. |
| 9,031,141 B2 | 5/2015 | Hadani et al. |
| 9,071,285 B2 | 6/2015 | Hadani et al. |
| 9,071,286 B2 | 6/2015 | Hadani et al. |
| 9,083,483 B1 | 7/2015 | Rakib et al. |
| 9,083,595 B2 | 7/2015 | Rakib et al. |
| 9,130,638 B2 | 9/2015 | Hadani et al. |
| 9,282,528 B2 | 3/2016 | Hashimoto |
| 9,294,315 B2 | 3/2016 | Hadani et al. |
| 9,444,514 B2 | 9/2016 | Hadani et al. |
| 9,548,840 B2 | 1/2017 | Hadani et al. |
| 9,553,984 B2 | 1/2017 | Krause et al. |
| 9,590,779 B2 | 3/2017 | Hadani et al. |
| 9,634,719 B2 | 4/2017 | Rakib et al. |
| 9,660,851 B2 | 5/2017 | Hadani et al. |
| 9,668,148 B2 | 5/2017 | Hadani et al. |
| 9,712,354 B2 | 7/2017 | Hadani et al. |
| 9,729,281 B2 | 8/2017 | Hadani et al. |
| 2001/0031022 A1 | 10/2001 | Petrus et al. |
| 2001/0033614 A1 | 10/2001 | Hudson |
| 2001/0046205 A1 | 11/2001 | Easton et al. |
| 2002/0001308 A1 | 1/2002 | Heuer |
| 2002/0034191 A1 | 3/2002 | Shattil |
| 2002/0181388 A1 | 12/2002 | Jain et al. |
| 2002/0181390 A1 | 12/2002 | Mody et al. |
| 2002/0181607 A1 | 12/2002 | Izumi |
| 2003/0073464 A1 | 4/2003 | Giannakis et al. |
| 2003/0185295 A1 | 10/2003 | Yousef |
| 2003/0235147 A1 | 12/2003 | Walton et al. |
| 2004/0044715 A1 | 3/2004 | Aldroubi et al. |
| 2004/0174812 A1 | 9/2004 | Murakami et al. |
| 2004/0189581 A1 | 9/2004 | Sako et al. |
| 2004/0218523 A1 | 11/2004 | Varshney et al. |
| 2004/0259554 A1 * | 12/2004 | Rappaport ............ H04W 16/18 455/446 |
| 2005/0157778 A1 | 7/2005 | Trachewsky et al. |
| 2005/0157820 A1 | 7/2005 | Wongwirawat et al. |
| 2005/0180517 A1 | 8/2005 | Abe |
| 2005/0207334 A1 | 9/2005 | Hadad |
| 2005/0251844 A1 | 11/2005 | Martone et al. |
| 2006/0008021 A1 | 1/2006 | Bonnet |
| 2006/0039270 A1 | 2/2006 | Strohmer et al. |
| 2007/0014272 A1 | 1/2007 | Palanki et al. |
| 2007/0038691 A1 | 2/2007 | Candes et al. |
| 2007/0078661 A1 | 4/2007 | Sriram et al. |
| 2007/0104283 A1 | 5/2007 | Han et al. |
| 2007/0110131 A1 | 5/2007 | Guess et al. |
| 2007/0211952 A1 | 9/2007 | Faber et al. |
| 2007/0237181 A1 | 10/2007 | Cho et al. |
| 2007/0253465 A1 | 11/2007 | Muharemovic et al. |
| 2007/0253504 A1 | 11/2007 | Hasegawa |
| 2008/0043857 A1 | 2/2008 | Dias et al. |
| 2008/0117999 A1 | 5/2008 | Kadous et al. |
| 2008/0186843 A1 | 8/2008 | Ma et al. |
| 2008/0187062 A1 | 8/2008 | Pan et al. |
| 2008/0232504 A1 | 9/2008 | Ma et al. |
| 2008/0310383 A1 | 12/2008 | Kowalski |
| 2009/0080403 A1 | 3/2009 | Hamdi |
| 2009/0092259 A1 | 4/2009 | Jot et al. |
| 2009/0103593 A1 | 4/2009 | Bergamo |
| 2009/0122854 A1 | 5/2009 | Zhu et al. |
| 2009/0161804 A1 | 6/2009 | Chrabieh et al. |
| 2009/0204627 A1 | 8/2009 | Hadani |
| 2009/0222226 A1 | 9/2009 | Baraniuk et al. |
| 2009/0303961 A1 | 12/2009 | Popovic et al. |
| 2010/0001901 A1 | 1/2010 | Baraniuk et al. |
| 2010/0008432 A1 | 1/2010 | Kim et al. |
| 2010/0027608 A1 | 2/2010 | Priotti |
| 2010/0111138 A1 | 5/2010 | Hosur et al. |
| 2010/0142476 A1 | 6/2010 | Jiang et al. |
| 2010/0187914 A1 | 7/2010 | Rada et al. |
| 2010/0238787 A1 | 9/2010 | Guey |
| 2010/0277308 A1 | 11/2010 | Potkonjak |
| 2010/0303136 A1 | 12/2010 | Ashikhmin et al. |
| 2010/0322349 A1 | 12/2010 | Lee et al. |
| 2011/0007789 A1 | 1/2011 | Garmany |
| 2011/0110532 A1 | 5/2011 | Svendsen |
| 2011/0116489 A1 | 5/2011 | Grandhi |
| 2011/0116516 A1 | 5/2011 | Hwang et al. |
| 2011/0126071 A1 | 5/2011 | Han et al. |
| 2011/0131463 A1 | 6/2011 | Gunnam |
| 2011/0216808 A1 | 9/2011 | Tong et al. |
| 2011/0286502 A1 | 11/2011 | Adachi et al. |
| 2011/0287778 A1 * | 11/2011 | Levin ................. H04W 64/006 455/456.1 |
| 2011/0292971 A1 | 12/2011 | Hadani et al. |
| 2011/0293030 A1 | 12/2011 | Rakib et al. |
| 2011/0299379 A1 | 12/2011 | Sesia et al. |
| 2011/0305267 A1 | 12/2011 | Rius et al. |
| 2012/0021769 A1 | 1/2012 | Lindoff et al. |
| 2012/0051457 A1 | 3/2012 | Ma et al. |
| 2012/0140716 A1 | 6/2012 | Baldemair et al. |
| 2012/0170684 A1 | 7/2012 | Yim et al. |
| 2012/0201322 A1 | 8/2012 | Rakib et al. |
| 2012/0213098 A1 | 8/2012 | Sun |
| 2012/0235795 A1 | 9/2012 | Liao et al. |
| 2012/0269201 A1 | 10/2012 | Atungsiri et al. |
| 2012/0272117 A1 | 10/2012 | Stadelmeier et al. |
| 2012/0320994 A1 | 12/2012 | Loghin et al. |
| 2013/0005285 A1 * | 1/2013 | Yin ................. H04B 17/27 455/115.1 |
| 2013/0021977 A1 | 1/2013 | Yang et al. |
| 2013/0058390 A1 | 3/2013 | Haas et al. |
| 2013/0077579 A1 | 3/2013 | Cho et al. |
| 2013/0083661 A1 | 4/2013 | Gupta et al. |
| 2013/0121497 A1 | 5/2013 | Smaragdis et al. |
| 2013/0230010 A1 | 9/2013 | Kim et al. |
| 2013/0260787 A1 | 10/2013 | Hashimoto |
| 2013/0279627 A1 | 10/2013 | Wu et al. |
| 2013/0315133 A1 | 11/2013 | Wang et al. |
| 2014/0143639 A1 | 5/2014 | Loghin et al. |
| 2014/0161154 A1 | 6/2014 | Hadani et al. |
| 2014/0169385 A1 | 6/2014 | Hadani et al. |
| 2014/0169406 A1 | 6/2014 | Hadani et al. |

(56) References Cited

U.S. PATENT DOCUMENTS

| | | |
|---|---|---|
| 2014/0169433 A1 | 6/2014 | Hadani et al. |
| 2014/0169436 A1 | 6/2014 | Hadani et al. |
| 2014/0169437 A1 | 6/2014 | Hadani et al. |
| 2014/0169441 A1 | 6/2014 | Hadani et al. |
| 2014/0247803 A1 | 9/2014 | Arambepola et al. |
| 2014/0348252 A1 | 11/2014 | Siohan et al. |
| 2014/0364128 A1 | 12/2014 | Lee et al. |
| 2015/0117395 A1 | 4/2015 | Hadani et al. |
| 2015/0326273 A1 | 11/2015 | Rakib et al. |
| 2015/0327085 A1 | 11/2015 | Hadani et al. |
| 2015/0382231 A1 | 12/2015 | Jabbar et al. |
| 2016/0043835 A1 | 2/2016 | Hadani et al. |
| 2016/0135132 A1 | 5/2016 | Donepudi et al. |
| 2016/0182269 A1 | 6/2016 | Hadani et al. |
| 2016/0191217 A1 | 6/2016 | Hadani et al. |
| 2016/0191280 A1 | 6/2016 | Hadani et al. |
| 2016/0254889 A1 | 9/2016 | Shattil |
| 2016/0277225 A1 | 9/2016 | Frenne et al. |
| 2016/0309345 A1 | 10/2016 | Tehrani et al. |
| 2016/0380743 A1 | 12/2016 | Rakib |
| 2016/0381576 A1 | 12/2016 | Hadani et al. |
| 2017/0012749 A1 | 1/2017 | Rakib et al. |
| 2017/0012810 A1 | 1/2017 | Rakib et al. |
| 2017/0019297 A1 | 1/2017 | Rakib |
| 2017/0033899 A1 | 2/2017 | Rakib et al. |
| 2017/0040711 A1 | 2/2017 | Rakib et al. |
| 2017/0078054 A1 | 3/2017 | Hadani et al. |
| 2017/0099122 A1 | 4/2017 | Hadani et al. |
| 2017/0099607 A1 | 4/2017 | Hadani et al. |
| 2017/0149594 A1 | 5/2017 | Rakib |
| 2017/0149595 A1 | 5/2017 | Rakib et al. |
| 2017/0201354 A1 | 7/2017 | Hadani et al. |
| 2017/0207817 A1 | 7/2017 | Hadani et al. |
| 2017/0222700 A1 | 8/2017 | Hadani et al. |
| 2017/0230215 A1 | 8/2017 | Rakib et al. |
| 2017/0244524 A1 | 8/2017 | Hadani et al. |
| 2019/0380090 A1* | 12/2019 | Kim ..................... H04W 48/20 |

FOREIGN PATENT DOCUMENTS

| | | |
|---|---|---|
| CN | 101939935 A | 1/2011 |
| EP | 1432168 A1 | 6/2004 |
| JP | 2011127910 | 6/2011 |
| WO | 2007004297 | 1/2007 |
| WO | 2011137699 A1 | 11/2011 |
| WO | 2011150315 | 12/2011 |
| WO | 2013148546 | 10/2013 |
| WO | 2014004585 | 1/2014 |
| WO | 2016014596 | 1/2016 |
| WO | 2016014598 | 1/2016 |
| WO | 2016176642 | 11/2016 |
| WO | 2016183230 | 11/2016 |
| WO | 2016183240 | 11/2016 |
| WO | 2016209848 | 12/2016 |
| WO | 2017003952 | 1/2017 |
| WO | 2017011478 | 1/2017 |

OTHER PUBLICATIONS

Notice of Allowance for U.S. Appl. No. 13/117,119, dated Feb. 28, 2014, 13 pages.

Banelli, P. et al., "Modulation Formats and Waveforms for 5G Networks: Who Will Be the Heir of OFDM?," IEEE Signal Processing Magazine, vol. 81, pp. 80-93, Nov. 2014.

El Hattachi, R. et al., "NGMN 5G Initiative White Paper," NGMN Alliance, Feb. 17, 2015. [Online]. Available: https://www.ngmn.org/uploads/media/NGMN_5G_White_Paper_V1_0.pdf, 125 pages.

Rusek, F. et al., "Scaling Up MIMO, Opportunities and Challenges with Very Large Arrays," IEEE Signal Processing Magazine, pp. 40-60 (2013).

Vodafone, "Cellular Internet of Things: Architectural Aspects," RP-150869, 3GPP RAN#68, Malmo, Sweden (Jun. 9, 2015), 19 pages.

Supplementary European Search Report for European Application No. 11787483.4, dated Sep. 9, 2014, 6 pages.

International Search Report and Written Opinion for International Application No. PCT/US2011/038302, dated Nov. 15, 2011, 8 pages.

International Preliminary Report on Patentability for International Application No. PCT/US2011/038302, dated Dec. 4, 2012, 7 pages.

Office Action for U.S. Appl. No. 13/117,124, dated Feb. 22, 2013, 7 pages.

Notice of Allowance for U.S. Appl. No. 13/117,124, dated Aug. 8, 2013, 10 pages.

Office Action for U.S. Appl. No. 14/605,957, dated Jun. 22, 2017, 6 pages.

Supplementary European Search Report for European Application No. 13809004.8, dated Apr. 14, 2016, 8 pages.

Communication Pursuant to Article 94(3) EPC for European Application No. 13809004.8, dated Feb. 17, 2017, 5 pages.

Notice of Allowance for U.S. Appl. No. 13/927,087, dated Feb. 25, 2015, 9 pages.

Office Action for U.S. Appl. No. 13/927,087, dated Nov. 12, 2014, 14 pages.

Gurevich, S. et al. "Group Representation Design of Digital Signals and Sequences," S.W. Golomb et al. (eds.), SETA 2008, LNCS 5203, pp. 153-166, Springer-Verlag Berlin Heidelberg (2008).

International Search Report and Written Opinion for International Application No. PCT/US2013/047723, dated Oct. 29, 2013, 17 pages.

International Preliminary Report on Patentability for International Application No. PCT/US2013/047723, dated Dec. 31, 2014, 15 pages.

Notice of Allowance for U.S. Appl. No. 13/927,088, dated Feb. 18, 2015, 7 pages.

Office Action for U.S. Appl. No. 13/927,088, dated Nov. 28, 2014, 13 pages.

Notice of Allowance for U.S. Appl. No. 13/927,086, dated Dec. 26, 2014, 8 pages.

Supplemental Notice of Allowability for U.S. Appl. No. 13/927,086, dated Mar. 19, 2015, 4 pages.

Office Action for U.S. Appl. No. 13/927,086, dated Oct. 14, 2014, 10 pages.

Office Action for U.S. Appl. No. 13/927,089, dated Dec. 24, 2014, 13 pages.

Office Action for U.S. Appl. No. 13/927,089, dated Aug. 14, 2015, 7 pages.

Supplemental Notice of Allowability for U.S. Appl. No. 13/927,091, dated Jun. 11, 2015, 4 pages.

Notice of Allowance for U.S. Appl. No. 13/927,091, dated Apr. 24, 2015, 8 pages.

Office Action for U.S. Appl. No. 13/927,091, dated Jan. 27, 2015, 15 pages.

Office Action for U.S. Appl. No. 13/927,092, dated Oct. 8, 2014, 5 pages.

Notice of Allowance for U.S. Appl. No. 13/927,092, dated Oct. 24, 2014, 7 pages.

Office Action for U.S. Appl. No. 13/927,095, dated Apr. 30, 2015, 11 pages.

Office Action for U.S. Appl. No. 13/927,095, dated Nov. 4, 2015, 9 pages.

Office Action for U.S. Appl. No. 13/927,095, dated Jun. 1, 2016, 10 pages.

Office Action for U.S. Appl. No. 14/717,886, dated Apr. 19, 2016, 10 pages.

Office Action for U.S. Appl. No. 14/709,377, dated Dec. 11, 2015, 12 pages.

Office Action for U.S. Appl. No. 14/709,377, dated Jul. 13, 2016, 17 pages.

Examination Report No. 1 for Australian Application No. 2013239970, dated Dec. 8, 2015, 3 pages.

"AT&T Annual Report 2014," Opening Our Network [Online]. Retrieved from the Internet: Sep. 22, 2016. <URL: http://www.att.com/Investor/ATT_Annual/2014/att_introduces_new_concepts_for_telecom_network.html>, 5 pages.

(56) References Cited

OTHER PUBLICATIONS

Catt, "UL ACK/NACK transmission methods for LTE-A," 3GPP TSG RAN WG1 Meeting #60bis, R1-102453, Beijing, China, Apr. 12-16, 2010, 8 pages.
Toskala, A. et al., "Physical Layer," Chapter 5 In: "LTE for UMTS: OFDMA and SC-FDMA Based Radio Access," Holma, H. et al. (eds.), John Wiley & Sons, Ltd., United Kingdom, 2009, pp. 83-135.
Mecklenbrauker, W., "A Tutorial on Non-Parametric Bilinear Time-Frequency Signal Representations," In: Time and Frequency Representation of Signals and Systems, Longo, G. et al. (eds.), Springer-Verlag Wien, vol. 309, pp. 11-68 (1989).
Nehorai, A. et al., "MURI: Adaptive waveform design for full spectral dominance (2005-2010)," AFOSR FA9550-05-1-0443, Final Report, [online], Mar. 11, 2011 Retrieved on May 11, 2013, Retrieved from the Internet <URL: http://oai.dtic.mil/oai/oai?verb=getRecord&metadataPrefix=html&identifier=ADA565420>, 103 pages.
Office Action for Japanese Application No. 2015-518647, dated Jul. 7, 2015, 10 pages.
Office Action for U.S. Appl. No. 14/754,596, dated Apr. 19, 2016, 18 pages.
Office Action for U.S. Appl. No. 14/809,129, dated Jul. 19, 2016, 5 pages.
Office Action for U.S. Appl. No. 15/617,962, dated Sep. 6, 2017, 10 pages.
International Search Report and Written Opinion for International Application No. PCT/US2016/050825, dated Feb. 8, 2017, 12 pages.
International Search Report and Written Opinion for International Application No. PCT/US2016/052524, dated Dec. 20, 2016, 8 pages.
Office Action for U.S. Appl. No. 15/374,995, dated Aug. 7, 2017, 6 pages.
International Search Report and Written Opinion for International Application No. PCT/US2017/025797, dated Jun. 21, 2017, 6 pages.
International Search Report and Written Opinion for International Application No. PCT/US2016/030259, dated Aug. 4, 2016, 13 pages.
Office Action for U.S. Appl. No. 15/152,464, dated Apr. 6, 2017, 10 pages.
Examination Report No. 1 for Australian Application No. 2013280487, dated May 2, 2016, 3 pages.
International Search Report and Written Opinion for International Application No. PCT/US2016/031928, dated Oct. 7, 2016, 10 pages.
Office Action for U.S. Appl. No. 15/188,946, dated May 8, 2017, 14 pages.
International Search Report and Written Opinion for International Application No. PCT/US2016/038584, dated Sep. 26, 2016, 8 pages.
Office Action for U.S. Appl. No. 15/187,668, dated Feb. 16, 2017, 6 pages.
International Search Report and Written Opinion for International Application No. PCT/US2016/031909, dated Aug. 11, 2016, 13 pages.
Office Action for U.S. Appl. No. 15/194,494, dated May 5, 2017, 16 pages.
International Search Report and Written Opinion for International Application No. PCT/US2016/039662, dated Nov. 29, 2016, 14 pages.
Office Action for U.S. Appl. No. 15/436,653, dated Jun. 2, 2017, 10 pages.
Office Action for U.S. Appl. No. 15/208,545, dated Aug. 21, 2017, 15 pages.
International Search Report and Written Opinion for International Application No. PCT/US2016/041940, dated Oct. 20, 2016, 8 pages.
Supplementary European Search Report for European Application No. 13768150.8, dated Oct. 30, 2015, 7 pages.
International Search Report and Written Opinion for International Application No. PCT/US2013/033652, dated Jun. 12, 2013, 8 pages.
International Search Report and Written Opinion for International Application No. PCT/US2015/041417, dated Oct. 1, 2015, 7 pages.
Office Action for U.S. Appl. No. 14/805,407, dated Dec. 14, 2016, 7 pages.
International Search Report and Written Opinion for International Application No. PCT/US2015/041420, dated Oct. 1, 2015, 6 pages.

* cited by examiner

RAY TRACING TECHNIQUE FOR WIRELESS CHANNEL MEASUREMENTS

CROSS-REFERENCE TO RELATED APPLICATION

This patent document is a 371 National Phase Application of PCT Application No. PCT/US2019/032605 entitled "RAY TRACING TECHNIQUE FOR WIRELESS CHANNEL MEASUREMENTS" filed on Aug. 7, 2018 which claims priority to and benefits of U.S. Provisional Patent Application No. 62/544,660 entitled "RAY TRACING TECHNIQUE TO TRACK TEMPORAL VARIATIONS IN A WIRELESS CHANNEL" filed on Aug. 11, 2017. The entire content of the aforementioned patent application is incorporated by reference as part of the disclosure of this patent document.

TECHNICAL FIELD

The present document relates to wireless communications, and more particularly, estimating a transmission channel in a wireless system.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry to come up with next generation of wireless technologies that can keep up with the demand on performance of wireless devices and networks. Many of those activities involve situations in which both the transmitter and receiver remain at the same location for long periods of time, such as in fixed wireless access (FWA) systems.

SUMMARY

This document discloses techniques for estimating the time variations of a wireless communication channel using a combination of an electromagnetic solver and suitable post-processing.

In one example aspect, a computer implemented method is disclosed. The method includes simulating, by a processor, using an electromagnetic solver including ray launching or ray tracing, multiple rays that reach a vicinity of a receiver of a wireless channel, determining locations of interactions of the rays with an environment of the wireless channel, post-processing, using one or more of the multiple rays, information about received signal at the receiver to obtain temporal variations therein, and determining a characteristic of the wireless channel using results of the post-processing.

In another example aspect, a computing system that implements the above-described methods is disclosed.

In yet another example aspect, the method may be embodied as processor-executable code and may be stored on a computer-readable program medium.

These, and other, features are described in this document.

DESCRIPTION OF THE DRAWINGS

Drawings described herein are used to provide a further understanding and constitute a part of this application. Example embodiments and illustrations thereof are used to explain the technology rather than limiting its scope.

DETAILED DESCRIPTION

To make the purposes, technical solutions and advantages of this disclosure more apparent, various embodiments are described in detail below with reference to the drawings. Unless otherwise noted, embodiments and features in embodiments of the present document may be combined with each other.

Section headings are used in the present document to improve readability of the description and do not in any way limit the discussion or the embodiments to the respective sections only.

In the description, the example of a fixed wireless access (FWA) system is used only for illustrative purpose and the disclosed techniques can apply to other wireless networks.

I. Brief Introduction

There is a wide interest in FWA systems, as they promise to deliver fast internet connectivity without the need for the expensive laying of cables to the customer premises. Many of the systems currently under development (or ready for deployment) are based on cellular standards such as the LTE (Long Term Evolution) standard of the Third Generation Partnership Project (3GPP). However, use of such standardized products for FWA is inefficient because those systems are designed to cope with user mobility. Propagation channels for FWA systems are mostly constant over time. On the other hand, design of transmission methods and deployment cannot completely rely on the channel being time-invariant, as some residual sources of time variations remain.

Some of the disclosed embodiments use a property that an FWA channel consists of the sum of a time-invariant part, superposed with a weaker time-variant component; the schemes used by these embodiments thus typically do not have equivalents for mobile wireless systems where it is assumed that the entire channel typically changes with time.

A FWA channel consists of components that are temporally invariant, such as (possibly) a line of sight (LOS) component, reflections on buildings, diffraction over rooftops, etc. These time-invariant components exist even in the case of a non-LOS scenario, i.e., where the direct optical LOS is blocked. In addition to these time-invariant components, there are also time-varying components, which mostly arise from three factors—(1) moving cars/trucks, (2) moving people, and (3) moving leaves.

Figure 1:
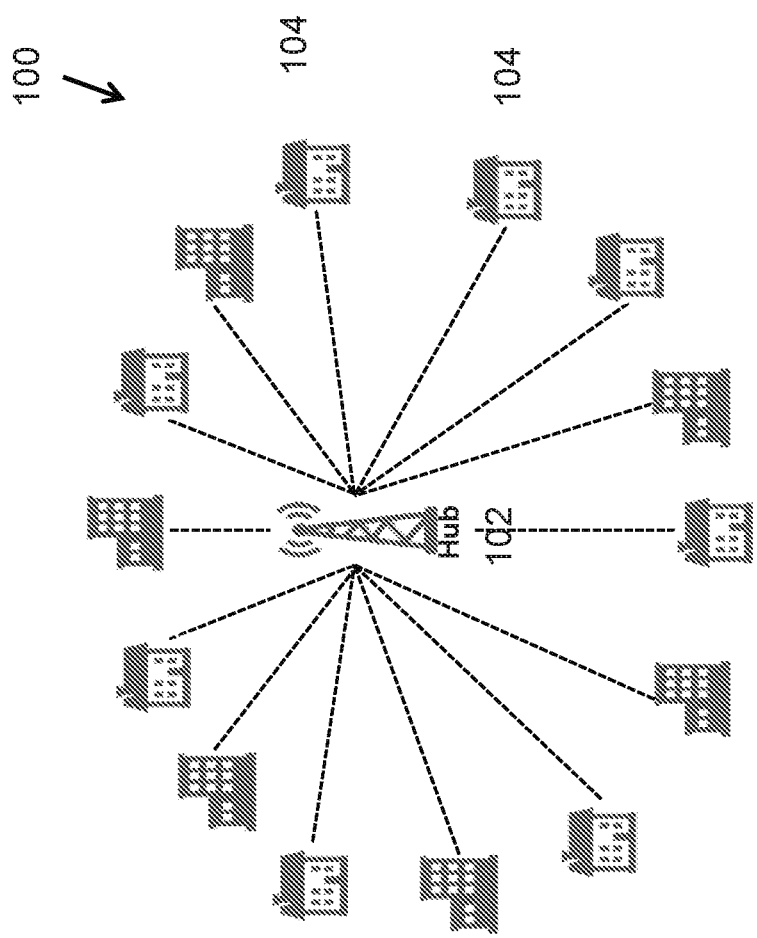
FIG. 1 shows an example of a fixed wireless access network.

FIG. 1 shows an example of a fixed wireless access system 100. A hub 102, that includes a transmission facility such as a cell tower, is configured to send and receive transmissions to/from multiple locations 104. For example, the locations could be user premises or business buildings.

A prerequisite for the planning, performance evaluation, etc., of FWA systems is a thorough understanding of FWA channels. Measurements with precision instrumentation give the most realistic knowledge about such propagation channels. However, it is time consuming and costly to perform long-term measurements in a large variety of locations.

The use of electromagnetic solvers (in particular those based on high-frequency approximations such as ray tracing or ray launching) is an attractive alternative to measurements for obtaining large sets of data for fixed wireless access channels. This document henceforth uses ray tracing or ray launching as an example for such solvers but the methods can be applied to other solvers as well. Channel evaluations using ray tracing can provide insights into the typical propagation characteristics with directional information. This information in turn can be used for the design and performance evaluation of the system with multi-beam antennas, among other applications. However, traditional ray tracing is based on the assumption that the interacting objects (IOs, also sometimes called scatterers) are static. Including the dynamics can be done, but currently is very computation intensive, since the environment has to be reconfigured, and the ray tracer run anew, whenever one of the IOs moves.

This patent document discloses a computationally efficient alternative for the simulation of time-varying IOs that, in some embodiments,—while approximate—provides the possibility of large-scale simulations and extracting suitable statistics within reasonable time. The approach is based on an analysis of the physical effects that can affect each of the rays, and a postprocessing of specific rays.

The characterization of the propagation channel is also useful for the design of fixed wireless access transmitters and receivers of orthogonal time frequency space (OTFS) signals. Some embodiments may use the information about the directional characteristics to design a multi-beam antenna (e.g., a Luneburg lens) and the associated scheduler, and the "spillover" from one beam to the next will have an impact on the spectral efficiency of the system. In order to design the system correctly, embodiments may simulate the distribution of the angular spreads around the quasi-LOS direction. For example, these estimates may be used so that the Luneburg beams may be designed to not be narrower than this spread. Embodiments may also estimate or calibrate the possible effect of common interacting objects (IOs) that reflect the signals from multiple customer premises equipment (CPEs). For obtaining suitable statistics of these parameters, a large number of channels (including many different Base Station, or BS, locations) may have to be investigated. While measurements would provide the most realistic results, it is simply not feasible to do such extended measurement campaigns in practice. Thus, ray tracing is a possible alternative. Ray tracing could provide reasonable approximation to the total received power (typically within 3-6 dB), and can provide some idea about the directional characteristics as well.

However, one of the weak points of conventional ray tracing is that it cannot easily provide information about the impact of moving IOs, though this is a topic of interest for the design of a FWA system. The conventional way of doing ray tracing with moving IOs is to fix each IO in a particular location, do the ray tracing, then move the IOs to the next location, do another set of ray tracings, and so on. It is obvious that such an approach is accurate, but also extremely time-consuming, in particular, e.g., for the simulation of moving cars with dense traffic, requiring the simulation of many such temporal snapshots.

Another source of temporal variations is wind-blown vegetation and trees. This is an effect that is very difficult to include in conventional ray tracing, and existing solutions for including vegetation include only a bulk vegetation attenuation, but do not consider the temporal variations induced by moving leaves and similar effects.

This document discloses an approximate, but computationally efficient, way of incorporating time variations in ray tracing simulations. Some embodiments may distinguish between the two fundamental effects of time variance, namely moving cars, and moving vegetation, as well as a third effect, namely moving people, which is mostly relevant for consumer premises equipment (CPEs) located indoor, away from the windows.

(i) For moving cars, some embodiments may identify multipath components (MPCs) that could be affected by moving vehicles, and obtain the Doppler spectra and Rice factors from a stochastic traffic model.

(ii) For the moving vegetation, some embodiments may model the temporal Rice factor for MPCs going through the vegetation based on measurement results, simulation results, or analytical derivations, and apply them both with respect to the MPCs transmitted through the vegetation, as well as the ones scattered from it.

(iii) For moving people, some embodiments may use a simple geometrical model of the human body to both compute the MPCs shadowed off by it, and establish the MPCs reflected by it.

In all three cases, the ray tracing may be performed only once to obtain a list of all MPCs, and then manipulate only select MPCs for inclusion of the temporal variations in post-processing. This may lead to a drastic reduction of the computation time. At the same time, it may be seen that the results are only approximate. For example, the calculations performed in some embodiments may assume that the MPCs change only amplitude and Doppler, but not direction or delay of the propagation.

II. Examples of Ray Tracing Models

Before going into the details of the time-varying effects, let us first review the ray-tracing model that is assumed to hold in the following examples. Some embodiments may better be described using ray launching (instead of "classical" ray tracing using image theory), which may provide better efficiency for simulating whole cells. In ray launching, embodiments may simulate one-by-one rays that are launched from the TX (usually the BS) into different directions. Specifically, assume that the rays are launched on a regular angular grid, e.g., at azimuth $\phi_i$ and elevation $\theta_i$, which are spaced equidistantly from each other. Each ray may represent a cone, e.g., rays that are transmitted into a range that can be written as:

$$[\phi_i-\Delta/2, \phi_i+\Delta/2]; \theta_i-\Delta/2, \theta_i+\Delta/2]] \quad \text{Eq. (1)}$$

For simplicity it may be assumed here that the quantization in elevation is the same as in azimuth, i.e., Δ. Implementations can then follow each ray as it travels along its trajectory, and interacts with the environment. When encountering an IO with an extended flat (smooth) surface, the ray might be specularly reflected (e.g., transmitted mainly in a single direction) and/or transmitted, leading to a change in amplitude, phase, polarization, and direction. Furthermore, when encountering a rough surface, the ray might be (partially) diffusely scattered in addition to a partial specular reflection; in the case it is incident on an edge, it gets diffracted. In the latter two cases, one incident ray can give rise to multiple outgoing rays, each of which then has to be followed; for this reason, including multiple diffractions (and diffuse scatterings) is much more time-consuming than specular reflections. Furthermore, diffracted or scattered rays are typically much more strongly attenuated. For these reasons, it is common to incorporate only 1 or 2 diffraction/scattering processes in the computations process, while higher-order interactions are neglected, while higher-order reflections (typically up to order 6 or 8) are included. The simulation stops when the ray either has become too weak to be relevant, or if it leaves the simulation area (which is different from the cell area—the simulation area must be larger because a ray might leave the cell, and be reflected back into it by objects outside the cell). Rays that hit the "collection sphere", a sphere with suitably chosen radius centered on the CPE position, are considered "relevant" for the impulse response at that CPE location, and its parameters (direction, angle, polarization, runtime, as well as all locations of points at which the interactions happen . . . ) are logged.

Since each ray represents a cone, the "cross section" of that cone might increase to very large values as the ray further and further propagates away from the BS. However, it is beneficial to keep the cross section of the cone from becoming larger than the size of typical objects. The solution for this issue is "ray splitting", e.g., whenever the cone cross section exceeds a threshold, the cone is split into two subcones with slightly differing directions. Some embodiments may be implemented to keep the cone front area at approximately the size of a car (e.g., between 6 to 15 feet length and 4 to 8 feet height). Alternatively, stochastic weighting may be used to determine which part of a ray gets reflected by a car, and which by the non-car-covered street. Each (split) ray should correspond to an MPC, at least approximately. This document often uses the expressions ray and MPC interchangeably.

III. Example Embodiments for Incorporating Moving Cars

Some implementations may refrain from using or tracking actual cars, but may simply identify the rays that could interact with cars, and manipulate their characteristics accordingly. Some implementations may start out by a regular ray tracing (or ray launching) as described herein, ignoring all cars. The result of this ray launching is a list of MPCs, where the implementations may provide not only DoA, DoD, amplitude and delay, but also a full list of all interaction points. This can be an output of a ray tracer, either by default, or with some minor manipulations. Implementations can then identify all rays that "hit" the ground (easy to identify by inspecting the z-coordinate of the reflection point).

Some additional features include:

(i) Some implementations may not simulate rays that, without cars, would not reach the receiver, but due to the presence of cars, manage to reach the receiver. This constitutes a loss of accuracy, and is a price paid for the simplified simulations. Such rays can be partly recovered by a method similar to described herein, by defining an enlarged "receiver area" (e.g., a 20 m-long stretch of the road in front of the receiver), and analyzing for each ray hitting this area whether the presence of a car would make it "hit" the receiver (or more precisely, the collection sphere around the receiver). Such an approach may use a larger initial simulation effort as well as larger post-processing effort, as more rays may be simulated and stored.

(ii) In some embodiments the physical phenomenon of "rays that hit the ground" may serve as the criterion to identify the rays for further post-processing. However, the fundamental approach (identify rays of interest and post-process them to incorporate their time-variant features) may not be limited only to such rays. In principle, any criterion for analyzing whether rays hit moving obstacles is possible. In particular, if the Customer Premises Equipment (CPE) is near ground level, e.g., at a height that makes it sensitive to passing trucks, then some implementations may use a "sensitivity region" around the CPE such that any rays that pass through it may be analyzed for possible interaction with cars, no matter whether they hit the ground or not.

IV. Examples of Traffic Model and Time Scales

The second ingredient in the simulations is a car traffic model. It provides the density of cars, as well as their movement speed. In some embodiments, the traffic model is time-variant, as different densities of cars are anticipated at different times. Some embodiments may use three different timescales for the temporal variations of the channel:

(i) At the top level, the traffic density changes over the course of hours (e.g., higher traffic density at rush hour than at night). The results for impact of moving cars will change as the density and movement speed of cars changes. Such movements produce different temporal Rice factors and different Doppler spectra on a timescale of hours.

(ii) At the next level, the position of cars changes over a timescale of multiple seconds. Implementations can either (a) track the movement of the cars, (b) look at different realizations, or "drops" of the cars, and investigate the channel properties separately for each of those, (c) look at the statistical probability for a ray to hit a car. The case (a) provides more detailed information about the time-series. For example, when considering only drops (or statistical probabilities for a ray to hit a car), it does not matter whether (bumper to bumper) traffic for 5 s is followed by no traffic for 5 s, versus continuous traffic with regular gaps between the cars; however, it may matter for the exact temporal evolution of the Doppler spectra.

(iii) Within each drop, the channel changes because of the Doppler effect, e.g., the interaction of some MPCs with a moving object. The distance that a car covers within this timescale is within the stationarity region of the channel, so that the definition of a Doppler spectrum is useful and meaningful.

V. Examples of Incorporating into Ray Tracing

In principle, each ray that "hits the ground" or otherwise potentially interacts with a car as described above, can be impacted by a moving car, while the other rays are no impacted. For the computation of the time-invariant part of the channel (e.g., the MPCs whose characteristics do not change even over several hours), implementation can simply take all rays that do not hit the ground. On the other hand, at a particular instant, or drop, not all rays that hit the ground really give rise to non-zero Doppler; rather it is just those rays that hit the ground at places where actually cars are located at this point. The Doppler shift of such a ray can be computed easily from the angle at which the ray is incident on the car, and the movement speed of the car.

For case (ii.b) in [0045], what may be done for a particular drop is to select (e.g., randomly, according to the traffic distribution) the ground-hitting rays that get cars associated to them, compute the Doppler shifts, and thus obtain overall the Doppler spectrum that is valid at a given point in time (actually, it is a delay-angle-Doppler spectrum, since each ray has a unique combination of Doppler, delay, and angles at TX and RX). From a single ray tracing run, multiple realizations of Doppler spectra through simple post-processing can be realized. To compute the temporal evolution of the Doppler spectra (for case (ii.a in [0045]), consistent movement of the cars may be assumed, instead of considering the situations at independent drops.

It is noteworthy that the temporal Rice factor, for a particular Doppler realization, as traditionally defined, varies over timescales (i) and (ii), and may be different from the ratio of the power of "always time invariant" rays versus that of "potentially impacted by cars". Accordingly, in some embodiments, which of those quantities is relevant for the system design depends on how the time-invariant channel component is estimated and further used. For example, if it is based on frequently-repeated pilot tones and the zero-Doppler part is isolated, then the temporal Rice factor is the most important quantity. When the time-invariant channel part is extracted from observations over many hours, then the estimate of that channel might deviate from the instantaneously active channel by a larger degree.

VI. Examples of Further Refinements—Shadowing Off a Car

The above approach makes the simplifying assumption that every ray that "hits" a car leads to a Doppler component. This need not be the case, since there are cars/trucks of different sizes, and a higher car might "shadow off" rays that are reflected by a lower car. Such shadowing off might be impacted by the height distribution of the cars, the distance between them, and the angle at which rays are incident. The conceptually simplest way is during each drop to assign different heights to the cars, and compute from geometric considerations whether a car- or ground reflected path is shadowed off by another car. It might be computationally more efficient to simply establish a pdf of the percentage of rays that are shadowed off, and then randomly select the rays that survive. While this may lose some information on correlation between different rays, it is a part of the approximation performed by the method, and the speed-up in computation time might be worth the reduced accuracy of the results. Furthermore, rays that hit the ground and do not hit a car might be shadowed off by another car. Since the shadowing off changes with time (due to the shadowing car changing its position with time), this is also an effect that may be included in the postprocessing.

VII. Examples of Incorporating Moving Vegetation

The second component of the temporal variation of an FWA channel is the movement of vegetation. In particular when both TX and RX are high above the ground, moving vegetation can be the dominant source of temporal variations, and much of the literature on time variations in FWA has been dedicated to this effect. The impact of vegetation on the time variation depends on the following parameters:

(i) Type of vegetation: Different types of trees give rise to different amounts of scattering and time variations. The type of leaves (size, water content), as well as the season (which impacts deciduous trees much more than coniferous trees) may be taken into consideration.

(ii) Wind speed: The temporal Rice factor decreases monotonically with wind speed, indicating that leaves that might stay static at low wind start to move at higher speeds.

In general, parameters for the temporal Rice factor of rays due to vegetation movement are extracted from measurements, either those available in the literature, or those that will still be done in the future. One difficulty in incorporating the impact of vegetation in ray tracing is the type of available measurements. These mainly fall into two categories:

(i) Investigation of the bulk temporal Rice factor: In this type of investigation, a particular existing link is analyzed, with the temporal variations of the received power being the basis of the analysis. This means that the investigation includes both MPCs that interact with moving vegetation, and those that do not. It is thus not clear how to best extract the impact of vegetation on the interacting MPCs alone. Obviously, as the wind speed increases, more vegetation starts to interact, so that one could conjecture that the temporal Rice factor as measured at high wind speeds represents that "true" ratio of the powers in interacting with noninteracting components. Another problem lies in the fact that traditional investigations do not consider between the impact of "propagation through vegetation" and "backscattering from vegetation", which would be advantageous to also include in the ray tracing.

(ii) Investigation of individual trees: In this type of experiment, an individual tree is placed in an anechoic chamber, and the effect of wind is emulated by ventilators blowing onto the trees. This provides a good possibility of analyzing both transmission through the trees, and the backscatter from the trees. However, it is not immediately obvious how the results can be extended to the case of multiple trees/wooded areas. We finally note that depolarization by the trees is another topic, and one that for which additional literature studies might be required. For the further considerations, we assume that some form of experimental investigation (or detailed simulation results) describing the temporal Rice factor from interaction with vegetation alone is available, as described below.

VIII. Embodiments of Measurement Operations

To help with the quantification of the impact of trees, some embodiments may implement a measurement campaign in which the transmission through trees, as well as scattering from trees, is analyzed. The measurements may be done using a directional (parabolic) antennas mounted with gimbals on the masts of the cars.

In some embodiments, measurements may be done on a windy day, as we would like to get a worst-case estimate. The transmitting antenna(s) TX could be located (stationarily) at a reasonable distance from a cluster of trees. The distance may be such that the beam only illuminates the tree (can compute that from the beamwidth considerations), but far enough such that the trees are more than a Rayleigh distance of the antenna away (e.g., about 30-40 m). When these two goals are in conflict, fulfilling the first one may be given preference. The receiver may then be moved on a circle around the tree cluster (as far as that is physically feasible with roads, etc., with the beam always oriented towards the cluster of trees (not towards the TX). At each location, the delay-Doppler impulse response (including the AGC settings) may be measured. From these measurements, the received power, as well as the temporal Rice factor can be extracted. This procedure may then be repeated for tree clusters of different depth. The different depth measurements could be restricted to just measure the propagation through the trees, not the backscatter, because, as a first approximation, the backscatter is independent of the depth of the vegetation. The final result from the measurements is a "radar cross section" or "beam pattern" for a cluster of trees, characterized by both the strength of scattering (transmission) into a particular direction, and the temporal Rice factor for this direction. This result can be directly entered into a ray tracing simulator.

IX. Incorporation of Literature and Measurements into Ray Tracer

Once the results from the measurements are available, they can be incorporated into ray tracers in a fairly straightforward manner. Vegetation clusters may be treated like any other dielectric objects, e.g., giving rise to reflections, scattering diffractions, and transmissions. This implies that a vegetation cluster can create multiple rays, each of which is treated differently. Each component will have a temporal Rice factor and Doppler spectrum associated with it which may be used for calculations and after weighing with the relevant antenna pattern, the temporal Rice factor of each ray interacting with vegetation may impact the overall temporal Rice factor.

X. Examples of Measurements for Moving People

Yet another source of temporal variations are moving people. For FWA systems with outdoor antennas, this is usually not a major concern. The scattering cross section of people is less than that of cars, so relatively speaking they might not play a big role except in areas such as pedestrian zones or event venues where cars are prohibited and moving people constitute the only source of moving objects that can interact with "ground-hitting" rays. However, if so desired, moving people may be incorporated in the same manner as moving cars.

A potentially much bigger impact occurs for CPEs located indoors, and possibly at a distance from the windows (if the CPE antenna is both close to the window and directionally pointing out the window, then even indoor located antennas would not interact much with humans). The main effects of humans in that case are (i) shadowing off MPCs that enter through the outside wall or window, and could reach the CPE antenna in the absence of humans), and (ii) giving rise to additional MPCs since the humans are scattering objects, and thus can constitute reflection points.

In terms of shadowing off radiation, a relatively simple model can be used to describe the effect: the human body is described (modeled) as a two-dimensional screen, and the attenuation is computed via the diffraction coefficients around that screen. The incorporation of this into a ray tracer is fairly simple: all arriving rays are tested on whether they pass through or near the "effective" screens, and the amplitudes of the rays are appropriately modified. In such cases, implementations may not create a Doppler spectrum, since the body shadowing violates the Wide Sense Stationary Uncorrelated Scattering (WSSUS) assumption; rather it is about the modifications of the power in the different MPCs. The "two-dimensional screen" is only one example implementation for determining shadowing by a human body. Alternatively, or in addition, ther empirically or theoretically determined models for the body shadowing may be used instead.

XI. Reflections Off the Human Body

The second influence is the creation of new MPCs due to reflections off the human body. A variety of investigations, again mostly in the mm-wave band, have shown that when human bodies do not block the LOS (Line Of Sight), they may actually lead to an increase in the total received power. An efficient incorporation can be done because only humans in close vicinity to the CPE are relevant (typically within the same room). Thus, it is useful to test all MPCs entering a room whether they interact with any of the humans (this step is similar to testing whether rays interact with the "screen" that can shadow them off). However, while for the shadowing off it is sufficient to test rays that hit the collection sphere, for the "human reflectors", all rays entering the room should be tested. Furthermore, for each of those rays, embodiments may check whether the reflected ray then hits the collection sphere. This may mean that a larger number of rays has to be traced and logged.

Figure 2:
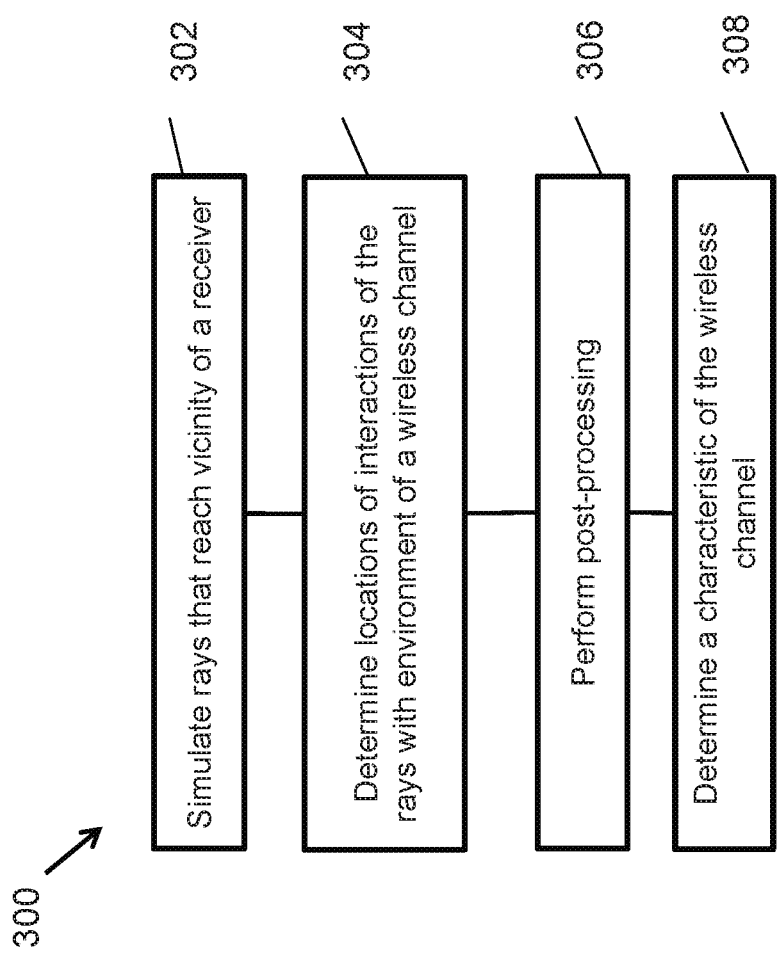
FIG. 2 is a flowchart representation of an example of a wireless communication method.

FIG. 2 is a flowchart of an example method 300. The method 300 may be used for simulating or measuring characteristics of a wireless access channel based on some of the techniques described in the present document. The method 300 may be performed prior to and/or separately from actual communication (e.g., user data) using a wireless channel such as an FWA channel. In some embodiments, the method 300 may be performed using general purpose processors. Alternatively, or additionally, special purpose computing hardware may be used for performing the method 300.

At 302, the method 300 includes, simulating, by a processor, using an electromagnetic solver including ray launching or ray tracing, multiple rays that reach a vicinity of a receiver of a wireless channel. In some embodiments, the rays may be launched over a regular angular grid. In some embodiments, the rays may be launched or traced one at a time and simulations may be performed on effects of launching one ray, and then a next ray may be launched.

The electromagnetic solver may, for example, may be a computer program that models propagation of electromagnetic waves and solves for the propagation of signals over the fixed wireless channel from a source to the receiver (and vice versa). The method 300 may limit the number of rays used for the simulation to rays that reach a vicinity of the receiver.

At 304, the method 300 includes determining locations of interactions of the rays with the environment of the wireless channel. This includes the MPCs that "hit the ground", enter the area from which they might effectively be reflected by moving cars to the CPE, go through vegetation, are shadowed off by a human, or are reflected off the body of a human near the CPE. The environment of the FWA may include information regarding locations of various reflectors, their types (or mathematical models of their reflections) and locations of the transmitter and the receiver.

At 306, the method 300 includes post-processing, using the one or more of the multiple rays, information about the nature and temporal variability of the IO locations to obtain information about the temporal variations of the affected rays. The post-processing may include determining a Doppler spectrum of the one or more multipaths. Alternatively, or in addition, temporal Rice factor may also be calculated for the FWA based on the estimation of the one or more multipath components.

In some embodiments, the estimation of the one or more multipath components may be performed by generating a ray tracing model for each of the multiple rays and incorporating effects from one or more of moving cars, moving vegetation or moving people. In some embodiments, beam width of each ray of the ray tracing model may be controlled to be below a threshold. The threshold may be a rectangular dimension corresponding to cross-section of a vehicle. For example, in some cases, rays may be split when their size (cross-section) increases above one of the dimension of the threshold.

At 308, the method 300 includes determining a characteristic of the wireless channel using results of the post-processing. The characteristic may be, for example, frequency-delay representation of the FWA or may be a mathematical representation of the FWA in the delay-Doppler domain, etc. For each of the rays determined in 308, the temporal Rice factor and Doppler spectrum is determined. In the case of rays potentially interacting with a car, it is determined from the traffic model whether such interaction takes place, and the Doppler shift is logged. For the rays interacting with vegetation, the temporal Rice factor as well as the Doppler spectrum for the particular ray (or multiple rays, if the interaction with the vegetation gives rise to multiple rays) are logged. For rays blocked by humans, the (time-varying) attenuation is computed as the human moves near the CPE. For rays reflected off humans, similarly the time-varying amplitude is computed, as well as the Doppler shift associated with the movement of the human.

In some embodiments, one or more of fast moving large discrete objects (cars, buses, trains, trucks, etc.), fast moving small clusters (bird flocks, foliage), slow moving discrete objects (people) may be used as IOs or scatterers during the simulation.

Using simulations of the FWA channel as described with respect to the method 300, subsequent data transmissions may be adapted to help in the network planning of the system, predict the performance in a particular location, and help in the allocation of the resources.

Subsequent to the determination of characteristics of the FWA, signal transmissions (and receptions) may be performed on the FWA wherein the pre-coding/transmission of the signals (on the transmission side) and reception of the signal (on the receive side) may be the mathematical model of the FWA.

Various embodiments and features may be described using the following implementation examples.

Example 1: A computer implemented method includes simulating, by a processor, using an electromagnetic solver including ray launching or ray tracing, multiple rays that reach a vicinity of a receiver of a wireless channel; determining locations of interactions of the rays with an environment of the wireless channel; post-processing, using one or more of the multiple rays, information about received signal at the receiver to obtain temporal variations therein; and determining a characteristic of the wireless channel using results of the post-processing.

Example 2. The method of Example 1, where the wireless channel is a fixed wireless channel and the temporal variations are due to moving objects in the environment only.

Example 3. The method of Example 1 or Example 2, wherein the post-processing comprises determining a Doppler spectrum and/or temporal Rice factor of the one or more rays.

Example 4. The method of Examples 1-3, further including estimating the one or more rays by: generating a ray tracing model and incorporating effects from one or more of moving cars, moving vegetation or moving people. The incorporation of the effects may be performed using the techniques described in Sections III to XI of the present document.

Example 5. The method of Example 4, wherein the generating the ray tracing model includes controlling a beam width of a given ray to be below a threshold, wherein the given ray is split into subcones in case that a cone cross section of the given ray exceeds the threshold.

Example 6. The method of Example 3, wherein in case that the beam width is larger than size of a vehicle, and the temporal Rice factor of the given ray is determined through weighting that depends on the ratio of the area covered by the cone corresponding to the given ray over the size of the vehicle. The threshold may be selected to roughly match the cross-section of expected IOs such as humans or vehicles. In the present document, vehicles generally mean any motorized or semi-motorized equipment that is used for movement of humans or goods.

Example 7. The method of any of Example 3-6, wherein the estimating the one or more rays includes identifying rays affected by moving vehicles and obtaining Doppler spectra and Rice factors therefor using a stochastic traffic model.

Example 8. The method of Example 7, wherein the stochastic model includes a probabilistic model of locations of the moving vehicles.

Example 9. The method of Example 7, wherein the stochastic model includes a model describing inter-vehicle distance and a number of vehicles passing through an area covered by the wireless channel per unit time.

Example 10. The method of Examples 7 or 8, further including: using stochastic weighting to determine which part or percentage of a ray gets reflected by a vehicle, and which gets reflected by a non-car-covered street. This may be obtained by taking into consideration an orientation of the vehicle with respect to the direction of travel of the ray.

Example 11. The method of Example 3, wherein the ray tracing model includes one or more of scatterers including one or more of moving discrete objects, or moving clusters of objects.

Example 12. The method of Example 11, wherein the moving discrete objects comprise a car, a bus, a train or a truck.

Example 13. The method of Example 11, wherein the moving clusters comprise bird flocks or foliage.

Example 14. The method of Example 11, wherein the moving discrete objects comprise pedestrians.

Example 15. The method of Example 5, wherein the threshold comprises a size between 6 to 15 feet length and 4 to 8 feet height.

Example 16. The method of Example 1, wherein the vicinity of the receiver comprises an area around the receiver and wherein the simulating includes analyzing, for each ray hitting this area, whether presence of a car would cause the ray to impinge upon the receiver.

Example 17. The method of Example 1, wherein, in case that the receiver is within a height of ground level, then the simulating includes analyzing, for a ray hitting a sensitive region around the receiver, a possible interaction with a vehicle or a pedestrian.

Example 18. The method of Example 1, wherein the ray tracing further includes: dividing the multiple rays into at least two groups comprising a first group of rays that hit ground and a second group of rays that do not hit the ground.

Example 19. The method of any of Examples 1 to 15, wherein the characteristic of the wireless channel includes a time-invariant portion and a time-variant portion, and the method includes determining the time-invariant portion by using only the first group of rays from the multiple rays or determining the time-invariant portion using rays that hit foliage or a person that is indoors near the receiver. In some example implementations, the characteristics of the wireless channel may be determined in the delay-Doppler domain in terms of number of reflectors and delay and Doppler impact of these reflectors on the rays.

Example 20. The method of Example 18, further comprising: analyzing rays in the first group of rays for a possibility of Doppler shift in a vicinity where the rays hit ground.

Example 21. The method of Example 17, wherein the analyzing includes using a traffic distribution model for determining presence of a vehicle in the vicinity where the rays hit ground.

Example 22. The method of Example 15, wherein the ray tracing further includes identifying, from the second group of rays that do not hit the ground, a set of rays that hit a car; and ascertaining, for a given ray in the set of rays, whether a Doppler shift arises from the given ray hitting a vehicle based on dimensions of other vehicles around the vehicle.

Example 23. The method of Example 1, further including computing a Doppler shift of a ray from an angle between the ray and a moving object, and a speed of the moving object.

Example 24. The method of Example 18, wherein the ray tracing further includes: identifying, from the first group of rays that hit the ground, a set of rays that hit a vehicle; and ascertaining, for a given ray in the set of rays, whether the given ray is shadowed off by another vehicle based on dimensions of the another vehicles.

Example 25. The method of Example 24, wherein the shadowing off is calculated by choosing the given ray stochastically and based on statistics related to a traffic model of other vehicles around the vehicle.

Example 26. The method of Example 1, wherein the locations of interactions include vegetation, and wherein the multiple rays include rays generated by transmission through, or reflections or scattering or diffractions from the vegetation, that is characterized by a temporal Rice factor.

Example 27. The method of any of Examples 1 to 26, wherein the environment of the fixed wireless channel comprises moving people and moving vehicles.

Example 28. The method of Example 26, where each ray arriving at the receiver is tested for whether it hits moving objects.

Example 29. The method of Example 27, wherein the method includes simulating using a two-dimensional screen model for moving people such that the attenuation is computed using diffraction coefficients around the two-dimensional screen model.

Example 30. The method of any of Examples 1 to 29, wherein the environment of the fixed wireless channel includes a room in which the receive is located, and wherein the determining the characteristic includes taking into account effect of human bodies in the room, including reflections generated from all rays entering the room that reflect off the human bodies and hit the vicinity of the receiver.

Example 31. The method of Examples 1-30, further including: performing a transmission of a communication signal over the wireless channel, by setting certain transmission parameters based on the obtained ray tracing results.

Figure 3:
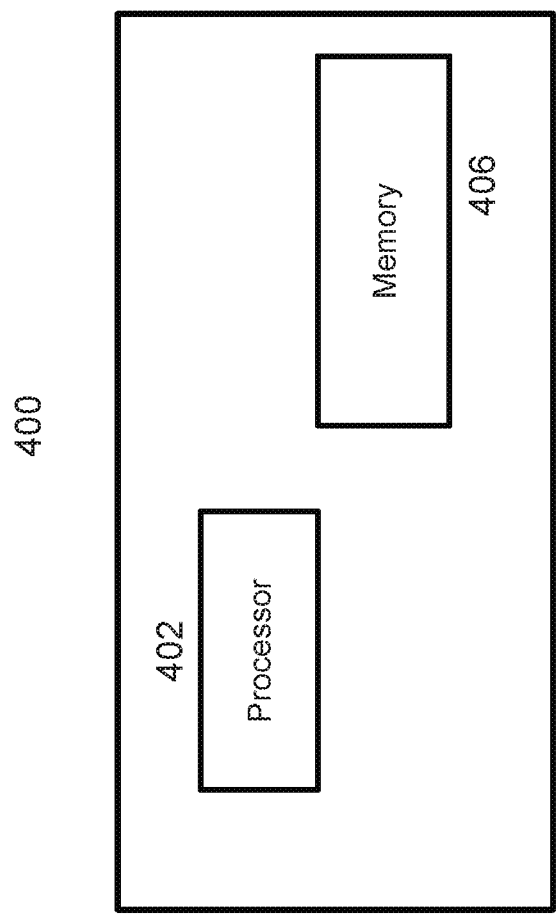
FIG. 3 shows an example of a wireless transceiver apparatus.

FIG. 3 shows an example of an apparatus 400 that may be used to implement some techniques described in this patent document. The apparatus 400 includes a processor 402, and a memory 406. In some embodiments, the apparatus 400 may include the memory 406 for storing instructions to be executed by the processor 402. The processor 402 may perform the operations described in the method 300.

This patent document discloses some novel ideas that can be used to build implementations that can incorporate in a ray tracing engine, in a computationally efficient manner, various sources of temporal variations in FWA channels. For example, instead of doing repeated ray tracing for an environment with objects (cars, humans) at different locations, it may be possible to do a single run of ray tracing and incorporate the temporal variations in a post-processing step. While this is only approximate, it drastically reduces the computational effort, and might be better suited for large-scale simulations that should provide statistically significant results.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment.

Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A computer implemented method, comprising:
    simulating, by a processor, using an electromagnetic solver including ray launching or ray tracing, multiple rays that reach a vicinity of a receiver of a wireless channel;
    determining locations of interactions of the rays with an environment of the wireless channel;
    post-processing, using one or more of the multiple rays, information about received signal at the receiver to obtain temporal variations therein; and
    determining a characteristic of the wireless channel using results of the post-processing;
    further including estimating the one or more rays by:
    generating a ray tracing model and incorporating effects from one or more of moving cars, moving vegetation or moving people, wherein the generating the ray tracing model includes controlling a beam width of a given ray to be below a threshold, wherein the given ray is split into subcones in case that a cone cross section of the given ray exceeds the threshold.

2. The method of claim 1, wherein the post-processing comprises determining a Doppler spectrum and/or temporal Rice factor of the one or more rays.

3. The method of claim 2, wherein in case that the beam width is larger than size of a vehicle, and the temporal Rice factor of the given ray is determined through weighting that depends on a ratio of an area covered by the cone corresponding to the given ray over the size of the vehicle.

4. The method of claim 1, wherein the estimating the one or more rays includes identifying rays affected by moving vehicles and obtaining Doppler spectra and Rice factors therefor using a stochastic traffic model.

5. The method of claim 4, wherein the stochastic traffic model includes a probabilistic model of locations of the moving vehicles or a model describing inter-vehicle distance and a number of vehicles passing through an area covered by the wireless channel per unit time.

6. The method of claim 1, wherein the ray tracing model includes one or more of scatterers including one or more of moving discrete objects or moving clusters of objects.

7. A computer implemented method, comprising:
    simulating, by a processor, using an electromagnetic solver including ray launching or ray tracing, multiple rays that reach a vicinity of a receiver of a wireless channel;
    determining locations of interactions of the rays with an environment of the wireless channel;
    post-processing, using one or more of the multiple rays, information about received signal at the receiver to obtain temporal variations therein; and
    determining a characteristic of the wireless channel using results of the post-processing;
    wherein the ray tracing further includes:
    dividing the multiple rays into at least two groups, wherein the at least two groups comprise:
    a first group of rays that hit ground and a second group of rays that do not hit the ground; or
    a group of rays that is used to determine a time-invariant portion of the wireless channel and another group of rays that is used to determine a time-variant portion using rays that hit foliage or a person that is indoors near the receiver.

8. The method of claim 7, wherein the ray tracing further includes:
    identifying, from the first group of rays that hit the ground, a set of rays that hit a vehicle; and
    ascertaining, for a given ray in the set of rays, whether the given ray is shadowed off by another vehicle based on dimensions of the another vehicles.

9. The method of claim 8, wherein the shadowing off is calculated by choosing the given ray stochastically and based on statistics related to a traffic model of other vehicles around the vehicle.

10. The method of claim 7, wherein the post-processing comprises determining a Doppler spectrum and/or temporal Rice factor of the one or more rays.

11. The method of claim 10, wherein in case that a beam width is larger than size of a vehicle, and a temporal Rice factor of a given ray is determined through weighting that depends on a ratio of an area covered by a cone corresponding to the given ray over the size of the vehicle.

12. An apparatus comprising a processor configure to implement a method, comprising:
    simulating, by the processor, using an electromagnetic solver including ray launching or ray tracing, multiple rays that reach a vicinity of a receiver of a wireless channel;
    determining locations of interactions of the rays with an environment of the wireless channel;
    post-processing, using one or more of the multiple rays, information about received signal at the receiver to obtain temporal variations therein; and
    determining a characteristic of the wireless channel using results of the post-processing;
    wherein the method further includes estimating the one or more rays by:
    generating a ray tracing model and incorporating effects from one or more of moving cars, moving vegetation or moving people, wherein the generating the ray tracing model includes controlling a beam width of a given ray to be below a threshold, wherein the given ray is split into subcones in case that a cone cross section of the given ray exceeds the threshold.

13. The apparatus of claim 12, wherein the post-processing comprises determining a Doppler spectrum and/or temporal Rice factor of the one or more rays.

14. The apparatus of claim 12, wherein in case that the beam width is larger than size of a vehicle, and a temporal Rice factor of the given ray is determined through weighting that depends on a ratio of an area covered by the cone corresponding to the given ray over the size of the vehicle.

15. The apparatus of claim 12, wherein the estimating the one or more rays includes identifying rays affected by moving vehicles and obtaining Doppler spectra and Rice factors therefor using a stochastic traffic model.

16. The apparatus of claim 15, wherein the stochastic traffic model includes a probabilistic model of locations of the moving vehicles or a model descripting inter-vehicle distance and a number of vehicles passing through an area covered by the wireless channel per unit time.

17. The apparatus of claim 12, wherein the ray tracing model includes one or more of scatterers including one or more of moving discrete objects or moving clusters of objects.

18. An apparatus comprising a processor configure to implement a method, comprising:
    simulating, by the processor, using an electromagnetic solver including ray launching or ray tracing, multiple rays that reach a vicinity of a receiver of a wireless channel;
    determining locations of interactions of the rays with an environment of the wireless channel;
    post-processing, using one or more of the multiple rays, information about received signal at the receiver to obtain temporal variations therein; and
    determining a characteristic of the wireless channel using results of the post-processing;
    wherein the ray tracing further includes:
    identifying, from a first group of rays that hit the ground, a set of rays that hit a vehicle; and
    ascertaining, for a given ray in the set of rays, whether the given ray is shadowed off by another vehicle based on dimensions of the another vehicles.

19. The apparatus of claim 18, wherein the shadowing off is calculated by choosing the given ray stochastically and based on statistics related to a traffic model of other vehicles around the vehicle.

20. The apparatus of claim 18, wherein the post-processing comprises determining a Doppler spectrum and/or temporal Rice factor of the one or more rays.

* * * * *